UNITED STATES PATENT OFFICE.

WALLACE APPLETON BEATTY, OF NEW YORK, N. Y.

ARTIFICIAL GUM AND PROCESS OF PRODUCING THE SAME.

1,225,750.   Specification of Letters Patent.   Patented May 15, 1917.

No Drawing.   Application filed June 30, 1915.   Serial No. 37,338.

*To all whom it may concern:*

Be it known that I, WALLACE APPLETON BEATTY, a citizen of the United States, residing at New York, in the county of New York and State of New York, have invented certain new and useful Improvements in Artificial Gum and Processes of Producing the Same; and I do hereby declare the following to be a full, clear, and exact description of the invention, such as will enable others skilled in the art to which it appertains to make and use the same.

This invention relates to a new substance or compound and to a method of producing the same, and has for one of its objects the production of said compound in an efficient and comparatively inexpensive and expeditious manner.

With this and other objects in view the invention consists in the novel substance or compound constituting my new article of manufacture, and in the novel steps and combinations of steps constituting my method or process, all as will be more fully hereinafter disclosed and particularly pointed out in the claims.

More particularly stated the purpose of the invention is to produce an artificial and inodorous gum to be used in the various arts, especially for coating, lacquering, and in solid forms for the production of articles of manufacture, all as is disclosed in my application #702,046, filed June 6, 1912, for artificial gum.

Stated generally the compound, or gum is made by mixing acetone or its homologues with phenol or certain of its homologues, and especially cresols or cresylic acid, to produce a condensation product, which product is later treated with formaldehyde or one of its polymers to produce a second condensation product which latter in turn constitutes my new gum, as will presently appear. In other words the process is carried out in two steps, the first consisting for example of the condensation of acetone with a phenolic body to produce a ketone-phenol condensation product of the character of dioxy-diphenyl-dimethyl-methane. When cresylic acid is condensed with acetone this product will be dioxy-ditolyl-dimethyl-methane, which product is later treated with an aldehyde, formaldehyde being preferred, to produce the second condensation product constituting my new gum.

A specific example of the carrying out of this process may be given as follows: I may mix together, say, nine hundred and sixty-five (965) parts by weight of a cresol, one hundred and seventy-five (175) parts by weight of acetone, and eighty-four (84) parts by weight of hydrochloric acid (HCl) having a specific gravity of say 1.20. This mixture is allowed to stand at from say 60° C. to 80° C. until the entire mass becomes pasty, or gummy, to form the first mentioned condensation product which in a pure state has a crystalline structure. I am not limited, of course, to hydrochloric acid in producing this first condensation product, for sulfuric acid ($H_2SO_4$) may be used, or other acids, having the same condensing properties.

The mass thus produced is next washed with water to free it from any excess of hydrochloric acid. The dioxy-ditolyl-methyl-methane thus produced will be found to consist of a dark gummy mass, soluble in all ordinary organic solvents such as alcohol, acetic acid, ethyl acetate, etc., but practically insoluble in water. The reaction producing this first named product may be written as follows:

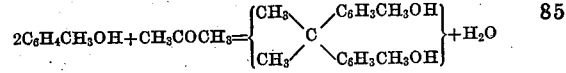

Having produced and washed the first condensation product and if necessary neutralized the last remaining portions of acid with an alkali, such as ammonia or caustic soda, I proceed to form the second condensation product or gum as follows: The above mass is dissolved in a hot solution, of 40% formaldehyde, in such quantities as will preferably contain exceeding sixty parts of formaldehyde to two hundred and fifty-six parts dioxy-ditolyl-dimethyl-methane. These proportions may of course, be varied.

To this mixture of said mass and formaldehyde is added a few parts by weight of a substance having an acid or an alkaline reaction to effect the condensation of the formaldehyde with the mass in order to produce the second condensation product or gum. The substance thus added may be in the form of an acid, but is preferably in the form of an alkali, or an alkaline earth hydrate, or a salt having an alkaline or acid reaction. Sodium hydroxid, ammonia, or an amin are generally used. The quantity of the alkali or acid used will of course vary with the nature of the substance added, and may be readily determined by experiment in each case.

A specific example of the production of the gum from the above mass and formaldehyde may be given as follows: To the above designated quantity of 40% formaldehyde and to each one hundred grams of the mass may be added one gram of sodium hydroxid (NaOH) which will be sufficient to produce the desired result although more may be used. The temperature is now raised to 100 degrees centigrade and the reaction proceeds to completion. Usually the heat of the reaction is sufficient to maintain it, so the external heat is removed. After a time, when the reaction has moderated, external heat is applied to raise the temperature again to 100° C., and the heating continued until the desired viscosity is attained. This requires about one hour. It is preferable to heat the mixture in a closed vessel. The liquid on standing separates into two layers, the upper of which consists of the excess of aldehyde and alkali dissolved in water, and the lower of which is the gum. This gum is next drawn off, washed with water and preferably dried in a vacuum at 50° C.

The reaction occurring between the dioxy-ditolyl-dimethyl-methane and the formaldehyde during the first heating probably is as follows:—

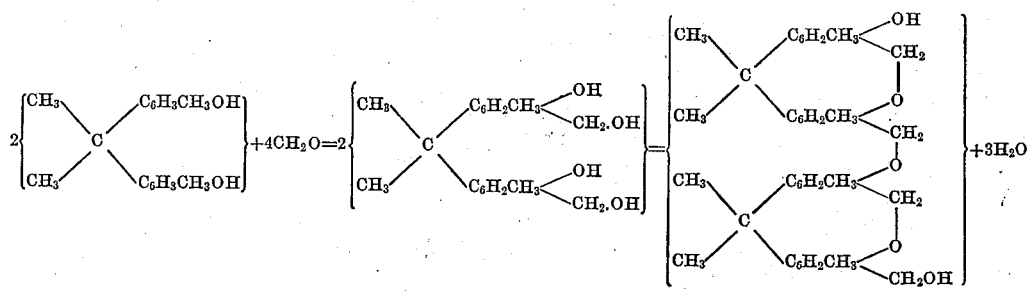

Upon further heating, further reactions take place, in which more water is liberated. The gum will vary with the amount of the alkali, the kind of alkali used, and with the purity of the dioxy-ditolyl-dimethyl-methane mass. The gum is soluble in strong alkali, and very brittle; but if acids are added to a solution of the gum in alkali a gum is precipitated which is insoluble in alkali. The gum is soluble in alcohol, acetone, glacial acetic acid, amyl alcohol, amyl acetate, or mixtures of these. It is insoluble in oils, as linseed oil, turpentine and mineral oils.

On heating the gum thus produced below 100° C., for a longer time, depending on the thickness of the layer, or a shorter time at 150° C., the gum passes gradually through different stages of less and less solubility toward the reagents which originally affected it until it becomes insoluble in its former solvents and only slightly affected by strong alkalis and acids. It is now an inodorous, transparent mass, very strong, non-brittle, and tenacious, instead of brittle as formerly, very hard, and will not burn unless kept continually in a flame. In this condition no solvent has been found for it.

As stated above, ammonia, formaldehyde and the mass may be used to produce the gum, but it has been found possible to produce the gum with a condensation product of formaldehyde and ammonia only; namely, hexamethylenetetramin. The advantage of using this last named method consists in obtaining a dry product in one step. It has been found that hexamethylenetetramin in the presence of dioxy-ditolyl-dimethyl-methane breaks down when they are heated together, giving the same result as when the latter substance is heated with ammonia and formaldehyde, ammonia being evolved. The reaction with a formaldehyde solution and ammonia is undoubtedly the same as with the hexamethylenetetramin. In both cases we have the ammonia evolved and taking no part in the reaction except as a catalytic or condensing agent.

The method of carrying out the reaction of this last named process is as follows: With seven hundred and sixty-eight parts of the dioxy-ditolyl-dimethyl-methane mass are mixed one hundred and forty parts of hexamethylenetetramin, and heated to about 100° C. The reaction begins immediately, ammonia being evolved. Care should be taken, however, that the product is heated just sufficiently to produce the evolution of ammonia, because as soon as the gum begins to be formed owing to the heat evolved, it is not necessary to maintain it at the temperature of 100° C., used in the beginning.

The reaction with hexamethylenetetramin $(CH_2)_6N_4$ may be represented as follows:

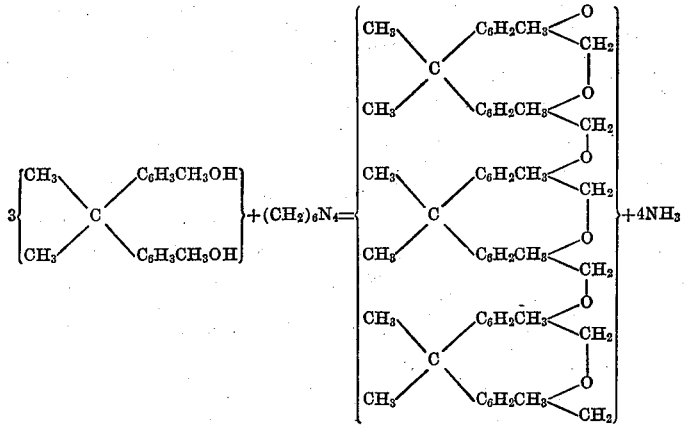

We have now a gum similar to the first form of gum described above, and which passes on further heating into an insoluble mass similar to the second form also described above.

Of course, aldehydes other than those mentioned above may be employed and still produce substantially the same gum.

It will thus be seen that an important feature of my invention resides in the fact that by employing the comparatively inexpensive materials consisting of acetone and cresylic acid, I am enabled to produce a raw base material (the above named dioxy-ditolyl-dimethyl-methane), in the form of a mass, which is capable of being inexpensively washed, thus freeing it from acid so that the subsequent reaction between said mass and formaldehyde produces at a very low cost a gum of great value, and capable of a wide range of uses.

Care should be taken to have the mass exactly neutral to indicators. The gum may be washed and care should be exercised to wash it free from soluble salts, formed by neutralizing the alkali. Care should further be used to dry it not farther than when it is free from water. It then remains plastic when heated to about 60° C., but on cooling to 25° C., or to room temperature, it is a brittle mass. When the gum is in this condition, it can be placed in molds and heated at 60° C. for about two to three hours, and it will pass to the insoluble and infusible condition.

I may also add acids to the soluble form of gum when dissolved in organic solvents, such as ethyl alcohol, acetone, amyl alcohol. The acids used may be hydrochloric, sulfonic, sulfuric, etc., so that the gum will contain say about 0.5% of acid. The gum will now become insoluble without heat if it stands over night, or if a greater proportion of acid is used it will become insoluble in a shorter time.

I may also obtain the gum in an insoluble form by heating the soluble gum with acid as just described, to about 60° C., when it will become infusible in say from 30 to 60 minutes.

Again the soluble gum may be heated to say 150° C. under pressure of 100 to 150 pounds for two hours without neutralizing or acidifying the gum when it will become insoluble.

By following the above procedures and adding salts such as ferric chlorid, aluminum chlorid, ammonium chlorid, zinc chlorid, etc., the conversion of the soluble into the insoluble or into infusible condition will be accelerated.

The product obtained by the condensation of hexamethylenetetramin above disclosed is a gum having the same properties as the gums obtained by condensing dioxy-ditolyl-dimethyl-methane with formaldehyde by means of alkali. No condensing agent is necessary in case of the hexamethylenetetramin product as it is a condensation of ammonia with formaldehyde and ammonia has the property of the alkali used in the description above.

I am aware that in 1891 Dianin described the preparation of ketone and phenol condensation products by means of acids, but the process was entirely impractical. He used an enormous excess of phenol to the quantity of acetone and, as a diluent in which to carry out the reaction, he used glacial acetic acid. Such a process would involve a great loss of material. He used, for example, seven parts of phenol to one of acetone, when the reaction requires only 58 parts of acetone to 188 parts of phenol, or practically only one part of acetone to three of phenol. The remainder of the phenol, in the process used by Dianin, was a total loss. He used an amount of glacial acetic acid which was equivalent to the amount of phenol. This also was a total loss, while the cost of the glacial acetic acid was as much as the entire quantity of phenol used.

I have found on the other hand that by using 58 parts of acetone and 188 parts of concentrated hydrochloric acid, the reaction proceeds to completion. If the mixture is allowed to stand in the cold for about four to five days, it will be converted into a solid mass of crystals. The crystals may be pressed as dry as possible, and the residue may be washed free from acid, while if a very good quality is wanted, they may be recrystallized from hot water or dilute alcohol. The crystals thus obtained have a melting point of 152 degrees centigrade and if pure are odorless, colorless and stable to light.

This process is commercially practical, and involves so far as I know an entire departure from any known process for the manufacture of these condensation products. This process is of course also applicable to the manufacture of condensation products of homologues of acetone and homologues of phenol.

It is obvious that those skilled in the art may vary the above procedure without departing from the spirit of my invention and therefore I do not wish to be limited by this disclosure, except as may be required by the claims.

What I claim is:—

1. The process of making a condensation product which comprises condensing a ketone with a cresol, and condensing the resulting product with an aldehyde, substantially as described.

2. The process of making a condensation product which comprises condensing a ketone with a mixture of cresols, and condensing the resulting product with an aldehyde, substantially as described.

3. The process of making a condensation product suitable for reacting with formaldehyde to produce a gum, which consists in heating an impure phenol containing a cresol with an impure ketone in the presence of a condensing agent, allowing crystals to form, and washing the product thus obtained, substantially as described.

4. A gum derived by the condensation of a ketone with a cresol, and further condensation with an aldehyde, said gum being soluble in alcohol and alkali and convertible into an insoluble mass, substantially as described.

5. The herein described gum derived by the condensation of an acetone and cresylic acid, and further condensation with formaldehyde, said gum being soluble in alcohol and alkali, and convertible into an insoluble mass, substantially as described.

In testimony whereof I affix my signature, in presence of two witnesses.

WALLACE APPLETON BEATTY.

Witnesses:
T. A. WITHERSPOON,
J. H. SIGGERS.